United States Patent [19]

Richter et al.

[11] 4,122,379

[45] Oct. 24, 1978

[54] ANALOGUE CONTROL DEVICE FOR ABUTMENT-FREE STROKE LIMITATION OF MACHINE TOOLS

[75] Inventors: Günter Richter, Nabern; Reinhard Fröschle, Ostfildern, both of Fed. Rep. of Germany

[73] Assignee: Maschinenfabrik Gehring Gesellschaft mit beschränkter Haftung & Co. Kommanditgesellschaft, Ostfildern-Nellingen, Fed. Rep. of Germany

[21] Appl. No.: 742,412

[22] Filed: Nov. 12, 1976

[30] Foreign Application Priority Data

Nov. 12, 1975 [DE] Fed. Rep. of Germany ....... 2550770

[51] Int. Cl.$^2$ ......................................... G05D 23/275
[52] U.S. Cl. .................................. 318/634; 318/579; 318/626; 318/627; 318/632
[58] Field of Search ............... 318/626, 663, 285, 579, 318/632, 627, 127, 167, 634; 60/538, 368, 369, 376

[56] References Cited

U.S. PATENT DOCUMENTS

| | | | |
|---|---|---|---|
| 2,885,618 | 5/1959 | Belsterling | 318/579 X |
| 3,039,035 | 6/1962 | Rudolf, Jr. et al. | 318/579 X |
| 3,403,310 | 9/1968 | Davidoff | 318/663 |
| 3,573,586 | 4/1971 | Littwin | 318/579 |

*Primary Examiner*—Robert K. Schaefer
*Assistant Examiner*—Eugene S. Indyk
*Attorney, Agent, or Firm*—Walter Becker

[57] ABSTRACT

An analogue control device with at least one electric stroke control emitter for the abutment-free stroke limitation of machine tools, especially honing machines, with which either a tool carrier or the workpiece connected to the machine tool carries out a reciprocatory stroke of adjustable length. As stroke control emitter there is provided a simple resistor which is adjustable in conformity with the machining movement and which is passed through by electric current, while pre-set values of the current or of the voltage generated by the current on the resistor are employed for limiting the stroke. The device also includes a warming-up or conditioning control which makes it possible automatically to carry out a predetermined number of working strokes with changed stroke length, the number and/or stroke length being adjustable.

7 Claims, 2 Drawing Figures

ANALOGUE CONTROL DEVICE FOR ABUTMENT-FREE STROKE LIMITATION OF MACHINE TOOLS

The present invention relates to a control system for the stroke limitation of a machine element, in which the element is connected with the slider of a potentiometer so that the voltage on the potentiometer slider varies in the respective direction with each direction of movement of the tool element. A pair of adjustable resistors are provided which form voltage sources with voltages conforming substantially to that of the potentiometer slider at the desired points of reversal of the tool element. The slider voltage is compared with the voltages at the adjustable resistors, and the tool element is reversed when the slider voltage bears a pre-determined relation to the voltage to which it is compared. A selectively adjustable delay may also be provided to delay the reversing of the tool element at at least one of the limits of travel thereof.

A control system of the above mentioned type is disclosed in our co-pending U.S. patent application Ser. No. 597,201 filed July 18, 1975 (now abandoned) and replaced by co-pending continuation-in-part application Ser. No. 846,031 — Richter et al filed Oct. 27, 1977. The obtainable precision of the stroke limits is very great over control devices prior to the invention set forth in said co-pending application Ser. No. 597,201 and by far exceeds the customary requirements.

However, it has been found that in certain cases of application, the switching over to the opposite direction of movement does not meet further increased requirements.

It is, therefore, an object of the present invention further to improve the above mentioned control system so that with all presently conceivable or imaginable cases of application, a high precision in the control reversal will be assured and extremely narrow workpiece tolerances will be obtained.

These and other objects and advantages of the invention will appear more clearly from the following specification in connection with the accompanying drawings, in which.

Figure 1:
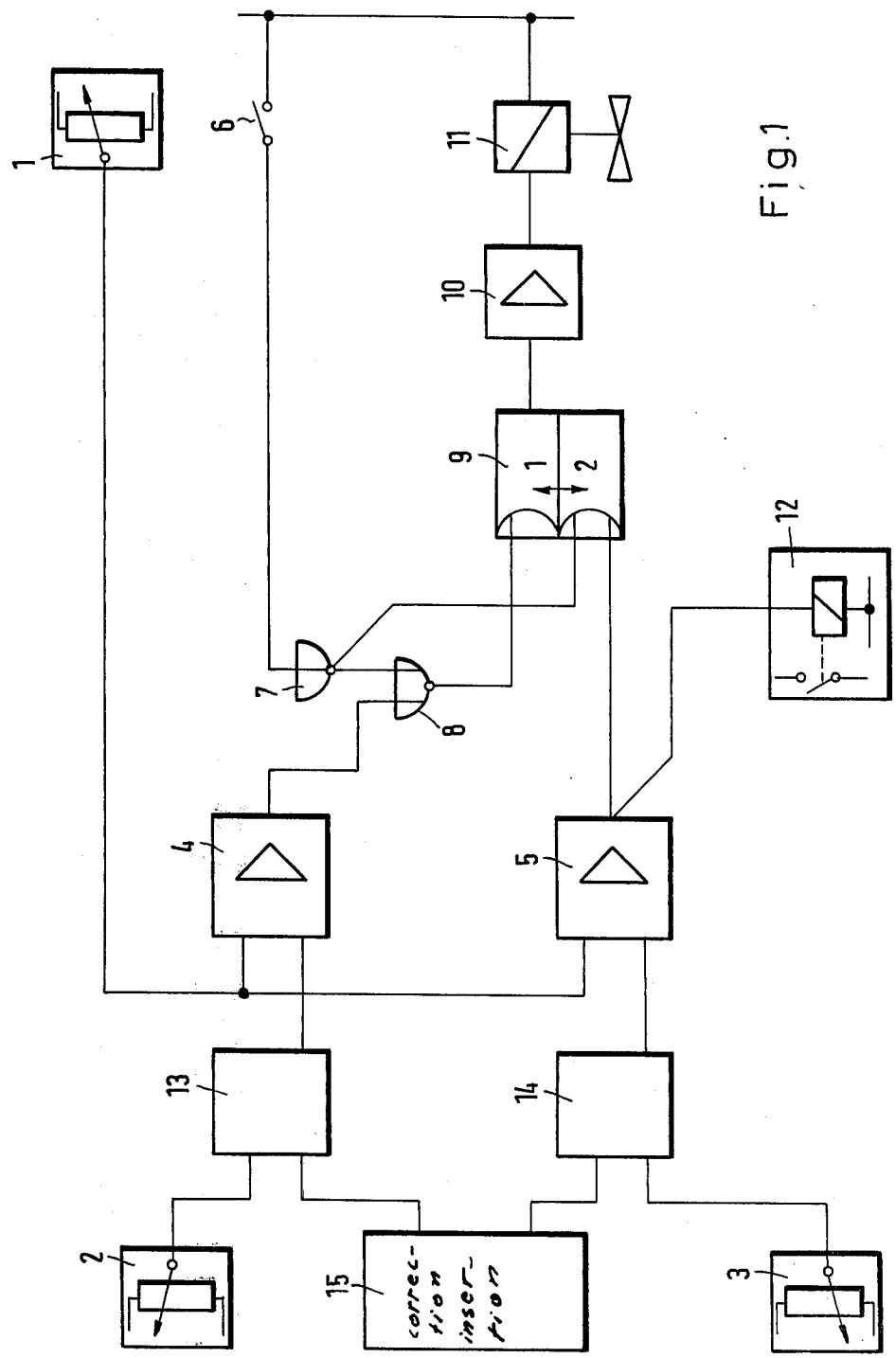
FIG. 1 illustrates a block diagram of the control device according to the invention.

The analogue control device according to the present invention is characterized over the control device set forth in the above mentioned co-pending U.S. Patent application Ser. No. 597,201 by a warming-up or conditioning control which makes it possible automatically to carry out a predetermined number of working strokes with changed stroke length while the number and/or the length of the stroke are adjustable.

In other words, a warming-up control is provided with which, after the working stroke movement has started, first for an adjustable time or number of working strokes, the machine tool operates with a reduced working stroke length in order to compensate for irregularities due to control delays in the hydraulic system (slide and valve shifting delay due to thickened oil, etc.), which irregularities occur after a longer standstill of the machine tool.

This warming-up control is preferably so set that after a sufficient rinsing of the hydraulic control device with oil from the tank, a proper operational control reversal will be assured. This is particularly important for instance when machining blind bores in order at the start of the machining operation to prevent the honing tool from moving onto the inner bore limit, and to exclude damage to the workpiece and the tool.

According to a further development of the invention, a temperature compensation control is provided which automatically takes into consideration the relatively great differences in the hydraulic oil temperatures. To this end, in a suitable manner, corresponding to the change in the hydraulic oil temperature, and in conformity with the machine characteristics, the predetermined rated values are influenced. The different control times of the hydraulic valves, slides, gates, etc., which are caused by the different oil temperatures and which would result in an undesired displacement of the reversal points will thus be compensated for, and the said reversal points will be maintained.

According to a further suggestion, the control device according to the invention with machine tools, especially honing tools operating with very different stroke speed of the working stroke device and/or with very different driving outputs of the tool spindle or the workpiece drive may be supplemented by a correction control which prevents a displacement of the reversal points by the above mentioned influences. To this end, the predetermined rated values are influenced in a suitable manner in conformity with the machine characteristics and in conformity with the change in the stroke speed and/or the change in the driving output of the tool spindle or the workpiece drive.

According to a still further suggestion, a correction control is provided for automatically compensating geometry errors of the workpieces.

Thus, for instance, when boring, in the region of the boring zones, when the size of the stroke is not correctly set or when greater tolerances apply to the length of the bore, deviations in the true cylindrical shape occur in such a form that with a stroke which is too long with regard to the length of the bore there will occur pre-widths (barrel shape of the bore), whereas when the stroke is too short, pre-narrowing (belly shape of the bore) will occur. According to a further development of the invention, this will be prevented by the fact that the bore of the workpiece during or after the honing operation is measured in a manner known per se and that in conformity with the obtained measurement by correction of the predetermined rated values, the stroke length is re-adjusted during or after the honing operation.

This correction may also be effected in a plurality of stages depending on the space application, for instance with the great deviations in shape.

Referring now to the drawing in detail, the control device according to FIG. 1 represents an improvement over the invention of applicant's copending application Ser. No. 597,201 in that it comprises a correction introducing device 15 in addition to the rated value indicators 2 and 3 designed as potentiometers by means of which rated value indicators the two limit positions of the stroke of a non-illustrated carrier of a honing machine can be set. Into this device 15 there are introduced the disorders measured in a known manner, such as start delay, hydraulic temperature changes, stroke changes and driving output changes as well as geometry errors of the workpieces and are converted to electric correction values for the change-over points, "Top" and "Bottom". These correction values are in associated addition means 13, 14 likewise added to the rated values predetermined by the rated value indicators 2,3.

Figure 2:
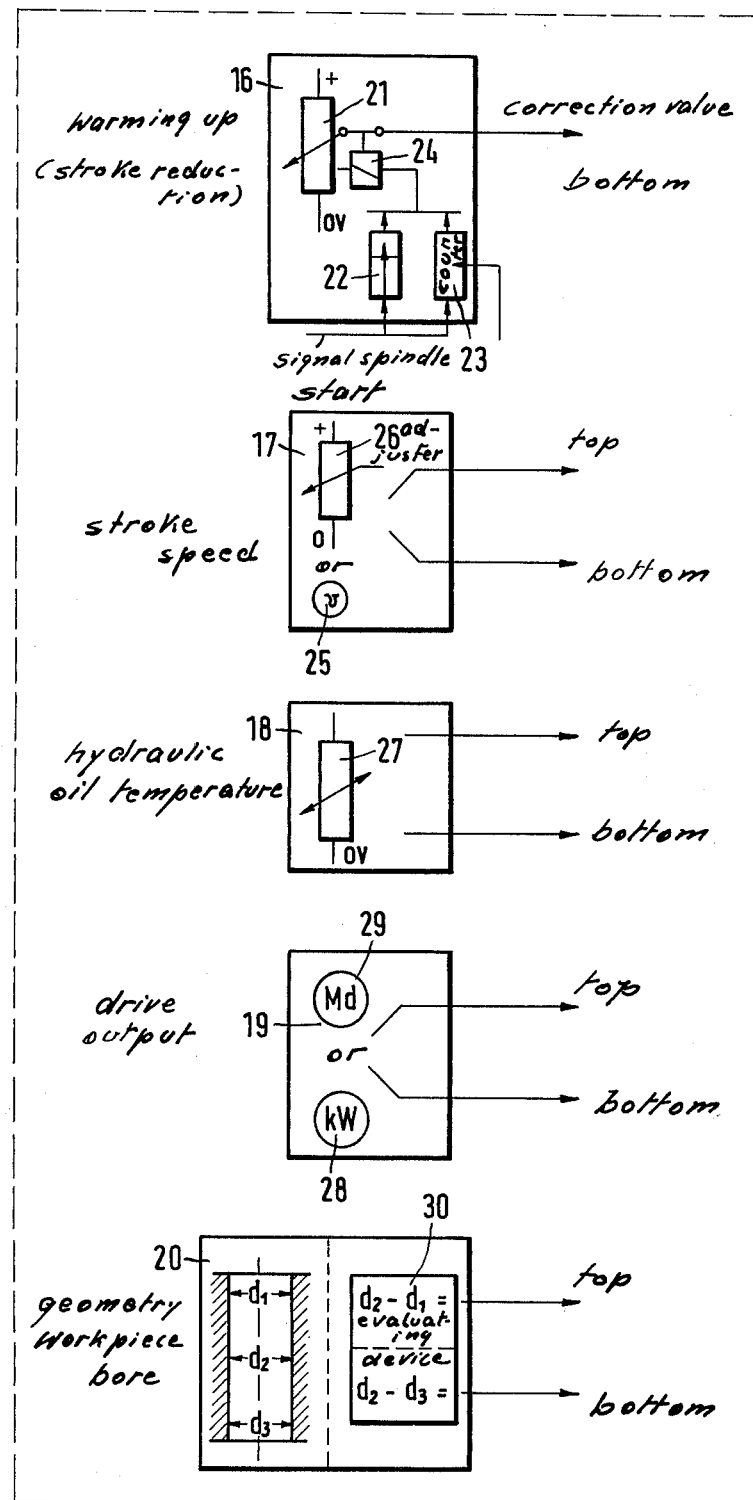
FIG. 2 is a diagrammatic illustration of the direct input device.

The corrected rated values received by the addition means or building blocks 13, 14 are conveyed to the threshhold value switches 4,5, and for the reversal of the direction of movement of the tool carrier are further employed in the manner described in the above mentioned co-pending application Ser. No. 597,201. The correction inserting device 15 consists primarily, as shown diagrammatically in FIG. 2, of the correction means or correction building blocks 16–20. The correction building block 16 comprises a so-called warming-up or conditioning control which takes into consideration the control delays occurring at the start of the machining operation, and does so by an automatic reduction in the stroke, especially at the lower reversal point, until constant operational conditions have been obtained. The magnitude of the stroke reduction is adjustable by a setting member 21. The duration of the stroke reduction may be controlled in conformity with time by a time member 2, or in conformity with the number of the working strokes by a counting device 23, which means that after the time member has completed its course or after a predetermined number of strokes have been carried out, the correction value is turned off by the switch 24.

The correction building block 17 compensates for the different overrunning strokes which occur at the reversal points with different stroke speeds. To this end, either by known means the stroke speed 25 is measured or according to a particularly simple embodiment the speed adjustor 26 draws a conclusion as to the stroke speed.

A further correction building block 18 will with hydraulically controlled machines automatically take into consideration changes in temperature in the hydraulic oil. The temperature of the hydraulic oil is measured in a known manner and in conformity with the machine characteristic for the upper and lower reversing point, by means of a temperature member 27 an electric correction value is formed and conveyed to the correction control.

The changes occurring during the machining operation with regard to the chip removal output due to different engaging conditions between the tool and the workpiece, require an automatic adaptation of the driving output of the machine. This continuous change in the driving output has negative results and affects reversal precision. These effects are prevented in conformity with the present invention by the correction building block 19 while as influencing factor for the correction transmission preferably the change in the rotary drive output 28 measured in a known manner or of the torque 29 is evaluated.

Furthermore, a correction building block 20 is provided for the automatic correction of geometry errors, especially errors concerning the true cylindrical shape of the workpiece bore. This correction is effected by corresponding adaptation of the reversal points. To this end, the workpiece bore is measured by known means and corresponding correction values are derived therefrom. For instance, as indicated diagrammatically in FIG. 2, the diameter is measured at the upper or top end of the workpiece bore $d_1$, in the center $d_2$, and at the lower or bottom end $d_3$. These measured values are conveyed to the evaluating device 30 which for the purpose of the correction ascertainment for the upper reversal point forms the difference of the measured values $d_2-d_1$. If the difference is positive, automatically a correction of the reversing point toward "Top" (stroke increase) and if the value is negative, a correction toward "Bottom" (stroke reduction) is effected. In a similar manner, also for the "Bottom" reversal point, the difference $d_2-d_3$ is formed and evaluated.

It is, of course, to be understood that the present invention is, by no means, limited to the specific showing in the drawing but also comprises any modifications within the scope of the appended claims.

What we claim is:

1. An analogue control device for the stroke control of a reciprocable member especially of a honing machine tool, which includes in combination: a stroke control emitter formed by an electrical resistor adjustable in conformity with the machining movement of said reciprocable member and adapted to be passed through by electric current, means operatively connected to said electrical resistor for employing a pre-set value of the current or voltage generated by said electric current on said resistor for limiting the stroke of said reciprocable member, and conditioning control means operatively connected to said stroke control emitter for causing said reciprocable member automatically to carry out a predetermined number of working strokes of changed stroke length, the number of said strokes being adjustable.

2. A device in combination according to claim 1, which includes means whereby length of said working strokes of said reciprocable member is adjustable.

3. A device in combination according to claim 2, which includes means operatively connected to said reciprocable member for causing said reciprocable member initially to carry out a predetermined number of working strokes having a reduced length.

4. A device in combination according to claim 3, in which said reciprocable member is pressure medium operable, and which includes a temperature compensating device for compensating changes in the reversing points of the strokes of said reciprocable member resulting from changes in the temperature of the pressure medium actuating said reciprocable member, said temperature compensating device being operable to control the pre-set rated values of said reversing points in conformity with the measured changes in temperature.

5. A device in combination according to claim 4, which includes a compensating circuit for influencing the pre-set rated values for the reversing points of said strokes in conformity with the measured changes in the stroke speed and driving output to thereby compensate for the changes of the reversing points resulting from changes of the stroke speed and from changes in the driving output of the tool spindle and workpiece drive.

6. A device in combination according to claim 5, which includes control means for automatically correcting the reversing points of said reciprocable member to correct geometry errors, especially errors as to the true cylindrical shape of the respective workpiece.

7. A device in combination according to claim 6, which includes a measuring device operatively connected to said control means for measuring the cylindrical shape of a bore in a workpiece and causing said control means to correct the rated values for the reversing points in conformity with the measured errors in the geometry of said workpiece.

* * * * *